US008252409B2

(12) United States Patent
Kasperchik et al.

(10) Patent No.: US 8,252,409 B2

(45) Date of Patent: Aug. 28, 2012

(54) DURABLE PRINTED COMPOSITE MATERIALS AND ASSOCIATED METHODS

(75) Inventors: Vladek Kasperchik, Corvallis, OR (US); David M. Kwasny, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 995 days.

(21) Appl. No.: 10/783,610

(22) Filed: Feb. 19, 2004

(65) Prior Publication Data

US 2005/0186400 A1 Aug. 25, 2005

(51) Int. Cl.

*B32B 3/00* (2006.01)
*B32B 7/00* (2006.01)
*B32B 15/00* (2006.01)

(52) U.S. Cl. ..... 428/209; 428/213; 428/457; 428/473.5; 428/474.4; 428/480

(58) Field of Classification Search .................. 428/209, 428/213, 457, 473.5, 474.4, 480

See application file for complete search history.

(56) References Cited

U.S. PATENT DOCUMENTS

| | | | | |
|---|---|---|---|---|
| 4,378,392 | A * | 3/1983 | Segel | 428/40.7 |
| 4,893,887 | A * | 1/1990 | Coates | 359/1 |
| 5,441,838 | A | 8/1995 | Pane | |
| 5,555,011 | A | 9/1996 | Tang et al. | |
| 5,582,669 | A | 12/1996 | Gove et al. | |
| 5,714,287 | A | 2/1998 | Malhotra et al. | |
| 5,798,161 | A | 8/1998 | Kita et al. | |
| 5,827,603 | A | 10/1998 | Suss | |
| 6,346,959 | B1 | 2/2002 | Uchiyama et al. | |
| 6,602,578 | B1 | 8/2003 | Tompkin et al. | |
| 6,610,412 | B2 | 8/2003 | Ungefug | |
| 6,808,583 | B2 * | 10/2004 | Kwasny et al. | 156/230 |
| 6,849,149 | B2 * | 2/2005 | Otaki et al. | 156/277 |
| 2001/0020636 | A1 * | 9/2001 | Koskenmaki et al. | 228/180.22 |
| 2002/0004134 | A1 * | 1/2002 | Shima et al. | 428/354 |
| 2002/0015292 | A1 * | 2/2002 | Pritchett et al. | 361/780 |
| 2002/0068224 | A1 * | 6/2002 | Danda et al. | 430/1 |
| 2002/0101497 | A1 | 8/2002 | Kwasny et al. | |
| 2002/0158960 | A1 | 10/2002 | Kasperchik et al. | |
| 2003/0013033 | A1 | 1/2003 | Kwasny et al. | |
| 2003/0044595 | A1 | 3/2003 | Christian et al. | |
| 2003/0142188 | A1 | 7/2003 | Jurrens et al. | |
| 2003/0194524 | A1 * | 10/2003 | Kwasny et al. | 428/40.1 |
| 2004/0003638 | A1 * | 1/2004 | Schaefer et al. | 72/41 |

FOREIGN PATENT DOCUMENTS

| | | |
|---|---|---|
| EP | 0 646 471 A | 4/1995 |
| EP | 1177 912 A | 2/2002 |
| EP | 1177912 | 2/2002 |
| EP | 1177912 | 6/2002 |

(Continued)

*Primary Examiner* — Betelhem Shewareged

(57) ABSTRACT

A durable printed composite material can include a printable layer having an image reverse printed thereon. The printable layer can be a transparent or translucent material. A metallic layer can be adhered to the image side of the printable layer using an adhesive layer. The layers are formed such that at least a portion of the metallic layer is visible through the printable layer. A method of forming a durable printed composite material can include reverse printing an image on a printable layer to form a printed surface. A metallic layer can then be adhered to the printed surface of the printable layer. Heat and pressure can be applied to the metallic layer to produce a durable printed composite material. The metallic layer can be at least partially visible through the printable layer. The durable printed composite material provides a medium which has an image having a reflective metallic background useful in a variety of applications.

27 Claims, 1 Drawing Sheet

FOREIGN PATENT DOCUMENTS

| | | |
|---|---|---|
| JP | 60189486 | 9/1985 |
| JP | 10297126 | 10/1998 |
| JP | 2002120434 | 4/2002 |
| WO | WO95/30547 | 11/1995 |

* cited by examiner

DURABLE PRINTED COMPOSITE MATERIALS AND ASSOCIATED METHODS

FIELD OF THE INVENTION

The present invention relates generally to durable images. More particularly, the present invention relates to durable images having a metallic background and methods for the production thereof.

BACKGROUND OF THE INVENTION

Images and signs can be produced using a wide variety of techniques. The advancement of digital photography and design has provided individuals and businesses with improved abilities to communicate and display various information. Hardcopy images which are protected from degradation due to factors such as handling, abrasion, liquid contact, ink smearing, fading, weathering, and oxidation is a desirable pursuit. Various methods to overcome and reduce degradation of hardcopy prints have been sought by those in the industry. However, many of these methods involve considerable expense and an undesirable number of steps.

In addition to the above, production of signs and documents having unique backgrounds with respect to printed information can provide consumers a broader choice of media on which to present such information. For this and other reasons, the need exists for improved methods and systems for forming images on varied backgrounds, which have decreased manufacturing costs and improved resistance to degradation.

SUMMARY OF THE INVENTION

It would be advantageous to develop improved methods and materials which can be used to produce a durable printed medium having a metallic background. In one aspect of the present invention, a durable printed composite material can include a printable layer having an image printed thereon. The printable layer can be a transparent or translucent material. A metallic layer can be adhered to the image side of the printable layer using an adhesive layer. The layers are formed such that at least a portion of the metallic layer is visible through the printable layer. The durable printed composite material provides a medium which has an image having a reflective metallic background useful in a variety of applications.

In another aspect of the present invention, a method of forming a durable printed composite material can include reverse printing an image on a printable layer to form a printed surface. The printable layer can be a transparent or translucent material. A metallic layer can then be adhered to the printed surface of the printable layer. Heat and pressure can be applied to the metallic layer to produce a durable printed composite material. The metallic layer of the durable printed composite material can be at least partially visible through the printable layer.

In yet another aspect of the present invention, a system for forming a durable printed composite material can include a printable layer comprising a transparent or translucent material, wherein the printable layer includes a printable surface configured for receiving a printed image. Further, the system can include a reflective metallic layer having an inner surface and an outer surface, wherein the inner surface is configured for adhering to the printable surface.

Additional features and advantages of the invention will be apparent from the following detailed description, which illustrates, by way of example, features of the invention.

Figure 1:
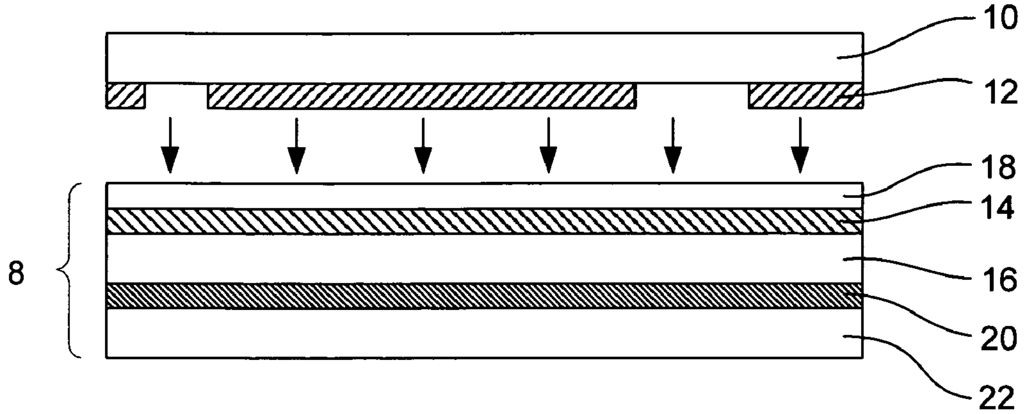
FIG. 1 illustrates a side cross-sectional view of an embodiment of the present invention showing materials for forming a durable printed composite material in accordance with the present invention.

It should be noted that the above figures are not drawn to scale and no limitations as to physical dimensions of the present invention are intended thereby. For example, the thicknesses of some of the layers are exaggerated for clarity. Those skilled in the art will recognize that the thicknesses can vary widely and can typically be formed using the dimensions discussed below, though other thicknesses can also be used.

DETAILED DESCRIPTION OF THE PREFERRED EMBODIMENT(S)

Reference will now be made to exemplary embodiments and specific language will be used herein to describe the same. It will nevertheless be understood that no limitation of the scope of the invention is thereby intended. Alterations and further modifications of the inventive features described herein, and additional applications of the principles of the invention as described herein, which would occur to one skilled in the relevant art and having possession of this disclosure, are to be considered within the scope of the invention. Further, before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms “a,” “an,” and “the” include plural referents unless the context clearly dictates otherwise. Thus, for example, reference to “a protective layer” includes reference to one or more of such materials.

As used herein, “transparent” refers to an optical property of a material which allows light to pass there through with minimal or no distortion. Typically, an image present at one side of the transparent material is clearly visible through the material when viewed from an opposing side. Transparent materials can include a colorant which imparts a particular color to any image viewed there through. Thus, for example, sunglass lenses would be considered a transparent material for purposes of the present invention.

As used herein, “translucent” refers to an optical property of a material which allows light to pass there through with some degree of distortion, but still allows a recognizable image or pattern to be seen through the material. Translucent materials can also include a colorant which imparts a specific color to any image viewed through the material.

As used herein, “durable” refers to a property of a material which improves resistance to wear of a printed substrate and reduces degradation of a printed image.

As used herein, “reverse printing” refers to the process of printing an image on a surface as a mirror image of the desired image, and which can be viewed through the transparent or translucent printable layer that the image is printed on.

As used herein, "ink-jetting" refers to the well known process of depositing liquids using ink-jet architecture, and is in no way limited to depositing inks or ink-containing compositions. Similarly, ink-jetting of materials "on" a substrate can include direct contact of such material with the substrate or can indicate that the material is printed in contact with a separate material or layer which is in direct or indirect contact with the substrate. Ink-jetting can include any known ink-jet technology such as, but not limited to, drop-on-demand systems such as thermal, piezoelectric, electrostatic, and acoustic; and continuous ink-jetting systems.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a size range of about 1 μm to about 200 μm should be interpreted to include not only the explicitly recited limits of 1 μm and about 200 μm, but also to include individual sizes such as 2 μm, 3 μm, 4 μm, and sub-ranges such as 10 μm to 50 μm, 20 μm to 100 μm, etc.

Referring now to FIG. 1, in accordance with one embodiment of the present invention, a durable printed composite material can be formed from a printable layer 10 and a transfer layer 8. The printable layer can be formed of any material such that the printable layer is transparent or translucent. In some embodiments of the present invention, it is desirable that the printable layer is transparent such that images and materials at one surface of the printable layer can be clearly viewed from an opposing surface. Non-limiting examples of suitable materials can include polyesters such as polyethylene terephthalate (PET), cellulose esters such as cellulose triacetate, cellulose acetate propionate, and cellulose acetate butyrate; polyamides, polycarbonates, polyimides, polyolefins, polysulfonamides; and composites or combinations thereof. In one aspect, the printable layer can be formed of polyethylene terephthalate.

Although any suitable transparent or translucent material can be used, typical commercially available materials can include two or more layers. For example, a first support layer can be used to provide a relatively thick and rigid substrate. The first support layer is primarily responsible for mechanical properties of the material. A second ink-receiving layer can typically be thinner than the support layer, e.g., most often from about 2% to about 30% of the support layer thickness. The ink-receiving layer can be configured to absorb ink and retain colorants. Typical materials used to form the ink-receiving layer can comprise a water-swellable polymer, e.g., polyvinyl pyrrolidone. Additional components can also be added to the ink-receiving layer to improve specific properties. For example, highly porous inorganic oxides, e.g., silica or alumina, can be added for faster drying. Additionally, a mordant, e.g., polymeric amines or quats (quaternary ammonium compounds), can improve retention of colorants, e.g., anionic dyes or other standard ink-jet colorants. One commercially available example of a suitable printable layer material can include Premium Inkjet Transparency Film (C3828A available from Hewlett-Packard Company).

In an alternative embodiment of the present invention, the printable layer can include additives within the layer. Alternatively, additives can be present in a separate overcoat layer. Additives can impart color, increase adhesion to the metallic layer, optimize image quality, increase scratch resistance, increase moisture resistance, reduce fading, and/or improve UV light protection. Non-limiting examples of suitable additives include polyesters, polystyrenes, polystyrene-acrylics, polymethyl methacylates, polyvinyl acetates, polyolefins, and copolymers and mixtures thereof.

In accordance with the present invention, an image 12 can be printed on one side of the printable layer 10. The image 12 can be reverse printed on the printable layer to form a printed surface. In accordance with the present invention, the image will typically be viewed through the surface opposite the printed surface. Thus, some adjustment to color images may be desirable to ensure accurate color reproduction. The image can be printed using any number of known printing technologies such as, but not limited to, ink-jet, electrostatic, laser, offset, gravure, liquid embossing, thermal spray deposition, roller coating, and liquid electrophotography. In one aspect, the reverse printing can be accomplished by ink-jet or laser printing. In another aspect, the reverse printing can be accomplished by electrophotographic printing. Further, the image can be formed of any known color-imparting material such as inks, polymers, fused toner, dyes, pigments, and the like. The image can also be of any format such as text or graphics.

In accordance with one embodiment of the present invention, a transfer layer 8 can include at least a metallic layer 14. The metallic layer can be formed of a reflective metal such as, but not limited to, aluminum, silver, indium, zinc, chromium, nickel, gallium, cadmium, palladium, molybdenum, gold, copper, rhodium, niobium and composites or alloys thereof. In one detailed aspect, the metallic layer can be formed of aluminum. Other materials can also be used for the metallic layer and can most often be formed of a reflective metal. In some embodiments of the present invention, it is desirable that the metal be reflective to provide a unique background appearance to the durable printed composite material. Depending on the desired appearance of the composite material, a colorant can also be added to the metallic layer. Such colorants are known to those skilled in the art and can be chosen and incorporated to achieve a particular color. For example, a yellow pigment can be added to an aluminum metal layer in order to achieve a gold appearance.

The metallic layer can be formed using any known method. Several exemplary methods include physical vapor deposition, electrodeposition, electroless deposition, extrusion, and the like. The metallic layer can be formed as an independent and self-supporting layer or can be formed directly on a substrate. In one aspect, the metallic layer can be electrodeposited onto a substrate. Although thickness can vary, the metallic layer can be a metal foil having a thickness from about 0.01 μm to about 5 μm. In one detailed aspect, the metallic layer can have a thickness from about 0.1 μm to about 2 μm.

In one alternative embodiment, the transfer layer 8 can further include a protective layer 16. The protective layer can be bonded to a surface of the metallic layer 14. The protective layer and metallic layer can be bonded using any known adhesive (not shown). Alternatively, the protective layer and metallic layer can be bonded through mechanical forces resulting from deposition of the metal directly on the protective layer. The protective layer can be formed of any suitable material and can include multiple layers. At least one function of the protective layer is to provide physical protection to the metallic layer. The protective layer can increase durability by improving resistance to physical wear and abrasion, as well as provide a barrier to liquid or dry materials such as water, alcohol, food, dirt, and the like. Further, the protective layer can be flexible such that during processing and/or handling, the material is resistant to cracking or separating from adjacent layers. Materials suitable for use in the protective layer can include, but are not limited to, polymers such as acrylic, epoxy, and mixtures thereof. In one aspect, the protective layer can have a thickness of from about 0.5 μm to about 100 μm, and can vary from about 5 μm to about 50 μm.

Additionally, the transfer layer 8 can also include an adhesive layer 18 adhered to the metallic layer 14 opposite the protective layer 16. The adhesive layer 18 can be formed using any known adhesive. However, it is preferable that the adhesive be transparent or translucent after application of heat and pressure as described below. Typically, the adhesive layer can have a thickness from about 0.5 μm to about 4 μm, although any range which is functional can be used.

Additional components can be added to the adhesive layer 18, metallic layer 14, protective layer 16, or the printable layer 10. These layers can include additional components such as, but not limited to, colorants, light stabilizers, liquid and vapor resistance additives, and other known additives. Suitable colorants can include dyes or pigments which provide a specific color to the final durable printed composite material. Non-limiting examples of suitable light stabilizers include hindered amines such as TINUVIN 292, TINUVIN 123, TINUVIN 144 (available from Ciba-Geigy Company) and UV absorbers such as benzophenones, benzotriazoles, acetanilides, cyanoacrylates, and triazines. Liquid resistance additives can be included to decrease the wetability of the surface to specific liquids. Suitable liquid resistance additives can include, for example, fluoro-surfactants, silanes, siloxanes, organosiloxanes, siliconizing agents, waxes, and combinations or mixtures thereof. Non-limiting examples of suitable vapor resistance additives include acrylonitrile copolymers and vinylidene chloride copolymers.

In an additional alternative embodiment, additional layers can be added to provide specific benefits to the durable printed composite material. For example, multiple layers can be included in the protective layer. During processing, the protective layer or other thin layers can develop small holes or pits which allow materials to penetrate through the layer. By including multiple layers, the chances that holes formed in each layer will line up sufficiently to allow material to pass through the multiple layers is decreased. Additionally, each layer can be optimized for specific attributes such as strength, fade resistance, gloss, and the like.

The printed surface of the printable layer 10 and the metallic layer 14 can be adhered via the adhesive layer 18. In an alternative embodiment, the adhesive layer can be formed on the printable layer. The printable layer and metallic layer can then be adhered using any number of contacting mechanisms. Contacting mechanisms suitable for use in the present invention can include apparatuses for heating and pressing. Heating and pressing can be accomplished using separate devices or can be accomplished in a single device. In accordance with the present invention, a system for forming the durable printed composite material can include a heating and pressing apparatus for adhering the printable layer and metallic layer together. In one embodiment of the present invention, the heating and pressing apparatus can include a loading mechanism for feeding individual printable layers into the apparatus. One suitable heating and pressing apparatus can include a commercially available laminator. A pick-up roller, or other similar device, can then carry the printable layer into the apparatus. Similarly, a feed mechanism for the metallic layer, or metallized thermal transfer overcoat, carries the metallic layer into contact with the printable layer along a media path. Various rollers and tension control mechanisms can also be employed to ensure that as the printable layer and metallic layer contact there is minimal or no air trapped between the layers and that the layers are oriented correctly.

A heating element can also be included along the media path of the metallic layer and printable layer. The heating element can be any known heating device such as, but not limited to, heated rollers, ceramic heater elements, thermal printheads, ultraviolet heaters, heater bars, heat lamps, heating plates, forced heated air blowers, and the like. In one detailed aspect, the heating element can be a heated roller which provides both heating and pressure to the printable layer and metallic layer. Further, the heating element can be configured for positioning in an engaged position, wherein the heating element is positioned adjacent the media path for heating, and in an idle position, wherein the heating element is removed slightly or significantly from the media path.

In an additional alternative embodiment, the system can further include a preheater configured for heating at least the reflective metallic layer prior to heating at the heating element. Preheating the metallic layer can aid in producing a smooth and durable interface between the printable layer and the adhesive layer.

In one alternative embodiment, pressing can be accomplished using a separate pressure roller. However the pressure is applied, it is preferred that the pressure be applied uniformly across the metallic layer to provide good adhesion of adjacent layers. In one aspect, pressing can be provided by a ceramic heating bar. Ceramic heating bars have the benefit of rapid heating and cooling, thereby reducing start-up time and energy usage. Typical operating temperatures for the heating and pressing apparatus can be of any temperature which is sufficient to securely adhere the printable layer 10 to the metallic layer 14. Such temperatures can vary considerably depending on the composition of the adhesive layer 18 and the other layers. However, in one aspect, the operating temperatures can be from about 70° C. to about 200° C.

Additionally, the layers can be translated through the system at a predetermined translation rate. The translation rate can affect the quality of the bond between layers and can also affect the surface appearance of the printable layer. For example, a slow rate through the system can result in a more matte appearance, while a faster rate can result in a more glossy appearance. Typical translation rates can range from about 0.1 in/sec to about 1 in/sec, although rates outside this range can be used as long as product quality is monitored. It will be understood that the steps of adhering the printable layer 10 to the metallic layer 14, and heating and pressing can be performed either sequentially or simultaneously. Additional alternative aspects of suitable systems are described in U.S. patent application Ser. No. 09/630,318, filed Jul. 31, 2000, and U.S. patent application Ser. No. 09/843,475, filed Apr. 26, 2001, each of which are incorporated by reference in their entireties.

Figure 2:
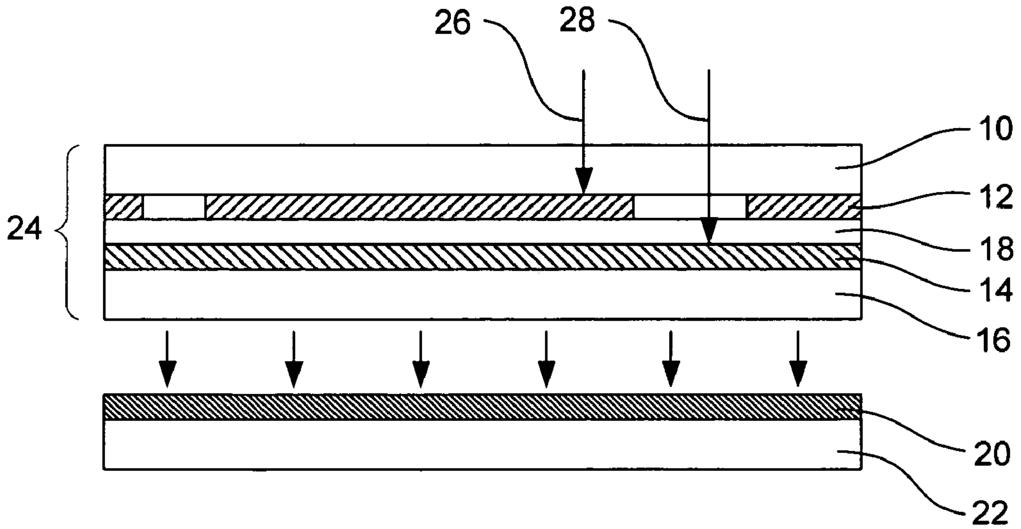
FIG. 2 illustrates a side cross-sectional view of a durable composite material formed from the materials of FIG. 1 according to an embodiment of the present invention.

In one aspect of the present invention, the metallic layer 14 can be provided as a metallized thermal transfer overcoat having the protective layer 16 bonded to a surface of the metallic layer. Such thermal transfer overcoat materials are known in the art and are also referred to as transfer ribbons, thermal transfer ribbons, hot stamping foils, roll foils, and transfer printing foils. FIG. 1 shows one embodiment of a transfer layer 8 wherein the layer further includes an optional release layer 20 and backing layer 22. Thus, as the metallized thermal transfer overcoat is heated and pressed, the release layer 20 allows the backing layer 22 to be easily removed, leaving the metallic layer and protective layer adhered to the printable layer 10, as shown in FIG. 2.

After heating and pressing the printable layer and the metallic layer, a durable printed composite material is removed from the system. As shown in FIG. 2, when the durable printed composite material 24 is viewed from the printable layer 10 side of the composite material, the printed image 12 is viewable, and the metallic layer 14 is at least partially viewable through the printable layer, such as indicated along viewing paths 26 and 28. Along path 28, though a space is shown between the printable layer and the adhesive layer 18, this will typically not be the case, as the adhesive will adhere to both the printed image and the printable layer. The resulting durable printed composite material includes an image having a unique metallic background. Such images can be useful in production of signs, advertisements, novelty items, creative personal artistic works, non-copyable documents, and the like. In addition, the image and metallic layer are protected from the outside environment by a transparent or translucent layer on one side and a protective layer on the opposite side. The final durable printed composite material is highly resistant to weathering, wear, fading, oxidation, and degradation of the image. In addition, the metallic layer can provide additional fade protection for the colorants printed on the printable layer. Specifically, the metallic layer can have good diffusion barrier properties which slow down penetration of reactive species which can cause fade such as oxygen, ozone, and the like.

In one aspect of the present invention, the durable printed composite material 24 can be flexible. Flexibility is partially the result of the very thin layers used in some embodiments of the present invention. In one embodiment, the thickness of the final durable composite material can be from about 50 μm to about 250 μm, although thicknesses outside this range can be used. Alternatively, the durable printed composite material can be more rigid, depending on the desired application.

The protective layer 16 and transparent or translucent printable layer 10 of the present invention provide an improvement over existing laminating technologies. Due to the thin layer used in some embodiments of the present invention, the protective layer can be adhered to select portions of the printable layer. This can be accomplished by applying heat and/or pressure only to desired areas, such as when using a thermal printhead as the heating apparatus. Separation of the backing layer 22 and the protective layers is clean and requires no additional steps for removal of the backing layer. Additionally, the thin layers of the present invention can reduce or eliminate curling of the durable printed composite material 24.

In an additional alternative embodiment, the system can include a printer configured for producing the printed image 12 on the printable layer 10. The printer can be any known printer such as, but not limited to, an ink-jet printer, a laser printer, or the like. The printer can be a separate unit, such that a user can first reverse print an image on the printable layer and then physically transfer the printable layer to the contacting mechanism. In order to expedite the method of the present invention, the system can include a printer, as well as a heating and/or pressing apparatus which are integrated into a single unit. In such a unit, the printable layer is fed into the printer for printing the image and the printable layer is automatically directed to the heating element where the metallic layer is adhered to the printable layer as described previously.

In yet another alternative embodiment, the system can include a dryer configured for drying the image prior to applying heat and pressure. Depending on the printing technique used to form the image 12 on the printable layer 10, it can be desirable to remove residual moisture from the surface prior to adhering the metallic layer 14 to the printable layer. For example, inkjet inks are often solvent based and benefit from at least some minimal drying to remove excess moisture. Some moisture can dissipate through the protective layer 16 over time, if the layer is sufficiently thin. However, the presence of excessive moisture in the final durable printed composite material 24 can result in blurring of the image, reduced adhesion of layers, and/or bubbling of the printable layer. Non-limiting examples of suitable dryers can include convection, conduction, or irradiation dryers. Specific dryers can include a radiative heating apparatus, a conductive heating apparatus, a convective heating apparatus, an infrared apparatus, an infrared radiative heating element, an ultraviolet apparatus, or a microwave apparatus.

The following example illustrates an exemplary embodiment of the invention. However, it is to be understood that the following is only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following example provides further detail in connection with what is presently deemed to be a practical embodiment of the invention.

EXAMPLE

A text and graphic image were reversed printed on a standard PET transparency using a DESKJET 970 printer. The printed side of the transparency was then coated with an aluminum hot stamping foil (BK610 081 1 available from Technical Coatings Laboratory, Inc.). The coated transparency was then fed through a laminator at 170° C. and a translation rate of 0.3 in/sec. The final durable printed composite material had a prominent and highly visible metallic sheen background.

It is to be understood that the above-referenced arrangements are illustrative of the application for the principles of the present invention. Thus, while the present invention has been described above in connection with the exemplary embodiments of the invention, it will be apparent to those of ordinary skill in the art that numerous modifications and alternative arrangements can be made without departing from the principles and concepts of the invention as set forth in the claims.

What is claimed is:

1. A durable printed composite material, comprising:

a) a printable layer having a viewing surface and a printed surface, wherein an image is printed on the printed surface, said printable layer comprising a transparent or translucent material, said printable layer including an ink-receiving layer;

b) a metallic layer having an inner surface and an outer surface, said inner surface of said metallic layer providing a reflective sheen background, said reflective sheen background being visible through at least a portion of said printable layer; and c) an adhesive layer adhered between the inner surface and the printed surface such that at least a portion of said metallic layer is visible through the printable layer wherein at least one of the layers includes an additive configured for one of light stabilization, liquid resistance, or vapor resistance.

2. The material of claim 1, wherein said metallic layer comprises a reflective metal selected from the group consisting of aluminum, silver, indium, zinc, chromium, nickel, gallium, cadmium, palladium, molybdenum, gold, copper, rhodium, niobium and composites or alloys thereof.

3. The material of claim 2, wherein said metallic layer comprises aluminum.

4. The material of claim 1, wherein said metallic layer further comprises a colorant.

5. The material of claim 1, wherein said metallic layer is a metal foil having a thickness of from about 0.01 μm to about 5 μm.

6. The material of claim 1, wherein the printable layer is transparent.

7. The material of claim 6, wherein the printable layer is polyethylene terephthalate.

8. The material of claim 1, further comprising a protective layer bonded to the outer surface of the metallic layer.

9. The material of claim 8, wherein the protective layer comprises a polymer selected from the group consisting of acrylic, epoxy, and mixtures thereof.

10. The material of claim 8, wherein the protective layer has a thickness of from about 0.5 μm to about 100 μm.

11. The material of claim 1, wherein the durable printed composite material has a thickness of from about 50 μm to about 250 μm.

12. The material of claim 1, wherein the durable printed composite material is flexible.

13. A durable printed flexible composite material, comprising:

a) a printable layer having a viewing surface and a printed surface, wherein an image is printed on the printed surface, said printable layer comprising a transparent or translucent material;

b) a metallic foil layer having an inner surface and an outer surface, said inner surface of said metallic foil layer providing a reflective sheen background, said reflective sheen background being visible through at least a portion of said printable layer;

c) an adhesive layer adhered between the inner surface and the printed surface; and d) a protective layer adhered to the outer surface of the metallic layer;

wherein the durable printed composite material has a thickness of from about 50 μm to about 250 μm.

14. A durable printed composite material, comprising:

a) a printable layer having a viewing surface and a printed surface, wherein an image is printed on the printed surface, said printable layer comprising a transparent or translucent material;

b) a metallic layer having an inner surface and an outer surface, said inner surface of said metallic layer providing a reflective sheen background, said reflective sheen background being visible through at least a portion of said printable layer, and said metallic layer being image-free; and c) an adhesive layer adhered between the inner surface and the printed surface such that at least a portion of said metallic layer is visible through the printable layer.

15. The material of claim 14, wherein said metallic layer comprises a reflective metal selected from the group consisting of aluminum, silver, indium, zinc, chromium, nickel, gallium, cadmium, palladium, molybdenum, gold, copper, rhodium, niobium and composites or alloys thereof.

16. The material of claim 15, wherein said metallic layer comprises aluminum.

17. The material of claim 14, wherein said metallic layer further comprises a colorant.

18. The material of claim 14, wherein said metallic layer is a metal foil having a thickness of from about 0.01 μm to about 5 μm.

19. The material of claim 14, wherein the printable layer comprises a member selected from the group consisting of polyesters, cellulose esters, polyamides, polycarbonates, polyimides, polyolefins, polysulfonamides, and composites or mixtures thereof.

20. The material of claim 14, wherein the printable layer is transparent.

21. The material of claim 20, wherein the printable layer is polyethylene terephthalate.

22. The material of claim 14, further comprising a protective layer bonded to the outer surface of the metallic layer.

23. The material of claim 22, wherein the protective layer comprises a polymer selected from the group consisting of acrylic, epoxy, and mixtures thereof.

24. The material of claim 22, wherein the protective layer has a thickness of from about 0.5 μm to about 100 μm.

25. The material of claim 22, wherein the durable printed composite material has a thickness of from about 50 μm to about 250 μm.

26. The material of claim 14, wherein the durable printed composite material is flexible.

27. The material of claim 1, wherein the printable layer comprises a member selected from the group consisting of polyesters, cellulose esters, polyamides, polycarbonates, polyimides, polyolefins, polysulfonamides, and composites or mixtures thereof.

* * * * *